US011115712B2

(12) United States Patent
Wyatte et al.

(10) Patent No.: US 11,115,712 B2
(45) Date of Patent: Sep. 7, 2021

(54) SYSTEMS AND METHODS FOR INDEXING, SEARCHING FOR, AND RETRIEVING DIGITAL MEDIA

(71) Applicant: Activision Publishing, Inc., Santa Monica, CA (US)

(72) Inventors: Dean Richard Wyatte, Boulder, CO (US); Christopher Anjos, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 253 days.

(21) Appl. No.: 16/224,403

(22) Filed: Dec. 18, 2018

(65) Prior Publication Data

US 2020/0188788 A1    Jun. 18, 2020

Related U.S. Application Data

(60) Provisional application No. 62/780,205, filed on Dec. 15, 2018.

(51) Int. Cl.
| | |
|---|---|
| A63F 13/79 | (2014.01) |
| H04N 21/454 | (2011.01) |
| A63F 13/75 | (2014.01) |
| G06N 20/00 | (2019.01) |
| G06N 3/08 | (2006.01) |
| G06K 9/62 | (2006.01) |
| A63F 13/352 | (2014.01) |
| A63F 13/63 | (2014.01) |

(52) U.S. Cl.
CPC ....... *H04N 21/4542* (2013.01); *A63F 13/352* (2014.09); *A63F 13/63* (2014.09); *A63F 13/75* (2014.09); *A63F 13/79* (2014.09); *G06K 9/6267* (2013.01); *G06N 3/084* (2013.01); *G06N 20/00* (2019.01)

(58) Field of Classification Search
CPC ............. H04N 21/454; H04N 21/4542; G06K 9/6267; A63F 13/75; A63F 13/79; A63F 13/795; A63F 2300/5546; A63F 2300/5553; A63F 2300/5586
See application file for complete search history.

(56) References Cited

U.S. PATENT DOCUMENTS

| | | | |
|---|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Steven J Hylinski
(74) *Attorney, Agent, or Firm* — Novel IP

(57) ABSTRACT

Systems and methods for indexing and searching for digital media in a multi-player gaming network are disclosed. In a game module stored locally in each client device, a content editor application generates a user interface through which a player may create, or search for, a personal visual symbol. Search queries are processed to determine asset signatures and, based on the asset signatures, corresponding stored personal visual symbol data are identified.

18 Claims, 6 Drawing Sheets

(56) References Cited

U.S. PATENT DOCUMENTS

| | | |
|---|---|---|
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |

(56) References Cited

U.S. PATENT DOCUMENTS

| | | |
|---|---|---|
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,259,806 B2 * | 9/2012 | Radhakrishnan ..... G06T 1/0028 |
| | | 375/240.15 |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,053,416 B1 | 6/2015 | De Leo |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,485,206 B2 * | 11/2016 | Day, II ................. H04W 4/029 |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,959,412 B2 | 5/2018 | Strauss |
| 10,320,927 B2 | 6/2019 | Zheng |
| 10,440,063 B1 | 10/2019 | Nevick |
| 10,733,326 B2 * | 8/2020 | Raichelgauz ......... H04H 60/56 |
| 2002/0126872 A1 * | 9/2002 | Brunk ................. H04N 19/467 |
| | | 382/100 |
| 2009/0054123 A1 * | 2/2009 | Mityagin ................ A63F 13/23 |
| | | 463/9 |
| 2009/0113448 A1 | 4/2009 | Smith |
| 2011/0034242 A1 * | 2/2011 | Aronzon ................ A63F 13/75 |
| | | 463/29 |
| 2012/0102028 A1 | 4/2012 | Nakata |
| 2012/0102246 A1 * | 4/2012 | Nakata ................ G06F 21/6209 |
| | | 710/106 |
| 2012/0106854 A1 * | 5/2012 | Tang ..................... G06K 9/6292 |
| | | 382/224 |
| 2012/0290591 A1 * | 11/2012 | Flynn ................. G06F 16/5866 |
| | | 707/754 |
| 2013/0282722 A1 | 10/2013 | Grenier |
| 2014/0344725 A1 | 11/2014 | Bates |
| 2016/0191671 A1 | 6/2016 | Dawson |
| 2017/0262635 A1 | 9/2017 | Strauss |
| 2018/0253661 A1 | 9/2018 | Strauss |
| 2019/0179895 A1 | 6/2019 | Bhatt |
| 2019/0240586 A1 * | 8/2019 | Taylor .................... A63F 13/86 |
| 2019/0387275 A1 * | 12/2019 | Cobb ................ H04N 21/4751 |
| 2020/0196011 A1 * | 6/2020 | Wyatte .................... G06N 3/08 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |

(56) References Cited

FOREIGN PATENT DOCUMENTS

| | | |
|---|---|---|
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

SYSTEMS AND METHODS FOR INDEXING, SEARCHING FOR, AND RETRIEVING DIGITAL MEDIA

CROSS REFERENCE

The present specification relies on, for priority, U.S. Patent Provisional Application No. 62/780,205 entitled "Systems and Methods for Receiving Digital Media and Classifying, Labeling and Searching Offensive Content Within Digital Media", filed on Dec. 15, 2018, which is incorporated by reference herein in its entirety.

FIELD

The present specification is related generally to the field of multiplayer online gaming. More specifically, the present specification is related to systems and methods that receive and process digital media to classify, label and search player-generated content, particularly offensive content, within a gaming environment.

BACKGROUND

Multiplayer online gaming has seen explosive proliferation across the globe with access to a wide range of age groups. These online games allow players with a wide variety of customizable features in order to enhance the overall user experience. One such feature is of enabling the players to generate their emblem, badge, banner, coat of arms, mascot, logo or insignia (collectively referred to as a personal visual symbol) as a means of self-expression and motivation during game play. The players are typically allowed to display these personal visual symbols during gameplay such as by displaying them on virtual gears, suits and/or weapons.

Unfortunately, knowingly and sometimes unknowingly, these personal visual symbols may portray offensive, toxic or objectionable content such as, for example, profane or foul textual content, racially insensitive content, or sexually explicit content. The prior art has recognized this problem and attempted to solve it with basic machine learning models. For example, U.S. Patent Publication No. 2016/0350675 discloses a machine learning model trained with features associated with content items. Scores are generated based on the model and are associated with probabilities that the content items include objectionable material. U.S. Pat. No. 8,849,911 discloses a content review process that generates a confidence score for reported content, where the confidence score comprises a measure of the probability that the reported content is inappropriate. Based on the confidence score, a social networking system either sends a request to the content owner to delete the reported content or sends information to the reporting user about what actually constitutes inappropriate content and asks them to reconfirm the content report. These approaches, however, are highly inaccurate and are not tuned to digital media generated by users in a video game context.

Accordingly, there is still a need for systems and methods that effectively and efficiently detect and classify player-generated personal visual symbols in the context of a video gaming system or network. There is also a need for systems and methods to search for offensive or toxic player-generated personal visual symbols that may be similar, yet a variant, of known offensive symbols, expressions or sentiments. There is further a need for systems and methods to enforce a plurality of content policies and guidelines that prevent use of objectionable personal visual symbols or content by the players and instead ensure use of acceptable expressions within a gaming environment.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method for indexing digital media and extracting one or more signatures of the digital media to enable a search of personal visual symbols in a multi-player gaming network, wherein the multi-player gaming network comprises at least one game server and a plurality of client devices in data communication and located remote from each other, the method comprising: generating, using a content search module stored locally in at least one of the plurality of client devices, a user interface through which a user may input search criteria for one or more digital media; receiving, in the at least one game server, the search criteria from the content search module; processing, in the at least one game server and using a content classification module, the search criteria to determine a plurality of asset signatures, wherein at least some of the asset signatures comprise one or more vectors or matrices comprising data representative of pixel values; querying a database comprising a plurality of stored asset signatures, wherein the database is remote from the at least one of the plurality of client devices and wherein the query comprises the plurality of asset signatures; and retrieving one or more personal visual symbols based upon a comparison of the plurality of stored asset signatures and the determined plurality of asset signatures.

Optionally, the at least one game server is configured to concurrently communicate with at least 20 of the plurality of client devices.

Optionally, the content classification module is configured to augment the inputted search criteria prior to processing by transforming the search criteria into a plurality of rendering instructions, wherein the plurality of rendering instructions comprise alphanumeric characters.

Optionally, the retrieved one or more personal visual symbol data comprises at least one of an image file or a plurality of rendering instructions in an alphanumeric format.

Optionally, the method further comprises generating the plurality of stored asset signatures by generating multiple personal visual symbols, in at least one of the plurality of client devices, wherein at least some of the multiple personal visual symbols comprise imagery designed to be not permissible in the multi-player gaming network and at least some of the multiple personal visual symbols comprise imagery designed to be permissible in the multi-player gaming network. Optionally, the method further comprises receiving, in the at least one game server, the personal visual symbols which comprise imagery designed to not be permissible in the multi-player gaming network and the personal visual symbols which comprise imagery designed to be permissible in the multi-player gaming network and assigning one or more labels to each of the personal visual symbols which comprise imagery designed to not be permissible in the multi-player gaming network and the personal visual symbols which comprise imagery designed to be permissible in the multi-player gaming network, wherein each of the one or more labels comprises a value indicative of whether a personal visual symbol is or is not to be permitted in the multi-player gaming network.

Optionally, the method further comprises submitting each of the labelled personal visual symbols which comprise imagery designed to not be permissible in the multi-player gaming network and the labelled personal visual symbols which comprise imagery designed to be permissible in the multi-player gaming network to at least one machine learning module, wherein the at least one machine learning module is configured to generate a trained classification module. Optionally, the content classification module comprises the trained classification module. Optionally, at least one of the imagery designed to not be permissible in the multi-player gaming network or the imagery designed to be permissible in the multi-player gaming network is submitted to the at least one machine learning module in a form of alphanumeric text without an accompanying graphical image.

Optionally, the method further comprises assessing at least one of the retrieved one or more personal visual symbols or the determined plurality of asset signatures for similar personal visual symbols.

The present specification also discloses a system for indexing digital media and extracting one or more signatures of the digital media to enable a search of personal visual symbols in a multi-player gaming network, wherein the multi-player gaming network comprises at least one game server and a plurality of client devices in data communication and located remote from each other, the system comprising: one or more processors in a computing device, said one or more processors configured to execute a plurality of executable programmatic instructions to index digital media and extract one or more signatures of the digital media to enable a search of personal visual symbols in the multi-player gaming network; a content search module, stored locally in at least one of the plurality of client devices, configured to generate a user interface through which a user may input search criteria for one or more digital media; a content classification module in the at least one game server, configured to receive and process the search criteria to determine a plurality of asset signatures, wherein at least some of the asset signatures comprise one or more vectors or matrices comprising data representative of pixel values; and a database remote from the at least one of the plurality of client devices and comprising a plurality of stored asset signatures, wherein the database is configured to be queried by a query comprising the plurality of asset signatures and wherein one or more personal visual symbols are retrieved based upon a comparison of the plurality of stored asset signatures and the determined plurality of asset signatures.

Optionally, the at least one game server is configured to concurrently communicate with at least 20 of the plurality of client devices.

Optionally, the content classification module is configured to augment the inputted search criteria prior to processing by transforming the search criteria into a plurality of rendering instructions, wherein the plurality of rendering instructions comprise alphanumeric characters.

Optionally, the retrieved one or more personal visual symbol data comprises at least one of an image file or a plurality of rendering instructions in an alphanumeric format.

Optionally, the system is configured to generate the plurality of stored asset signatures by generating multiple personal visual symbols, in at least one of the plurality of client devices, wherein at least some of the multiple personal visual symbols comprise imagery designed to be not permissible in the multi-player gaming network and at least some of the multiple personal visual symbols comprise imagery designed to be permissible in the multi-player gaming network. Optionally, the system is configured to receive, in the at least one game server, the personal visual symbols which comprise imagery designed to not be permissible in the multi-player gaming network and the personal visual symbols which comprise imagery designed to be permissible in the multi-player gaming network and assigning one or more labels to each of the personal visual symbols which comprise imagery designed to not be permissible in the multi-player gaming network and the personal visual symbols which comprise imagery designed to be permissible in the multi-player gaming network, wherein each of the one or more labels comprises a value indicative of whether a personal visual symbol is or is not to be permitted in the multi-player gaming network.

Optionally, the system is configured to submit each of the labelled personal visual symbols which comprise imagery designed to not be permissible in the multi-player gaming network and the labelled personal visual symbols which comprise imagery designed to be permissible in the multi-player gaming network to at least one machine learning module, wherein the at least one machine learning module is configured to generate a trained classification module. Optionally, the content classification module comprises the trained classification module. Optionally, at least one of the imagery designed to not be permissible in the multi-player gaming network or the imagery designed to be permissible in the multi-player gaming network is submitted to the at least one machine learning module in a form of alphanumeric text without an accompanying graphical image.

Optionally, the system is configured to assess at least one of the retrieved one or more personal visual symbols or the determined plurality of asset signatures for similar personal visual symbols.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1A:
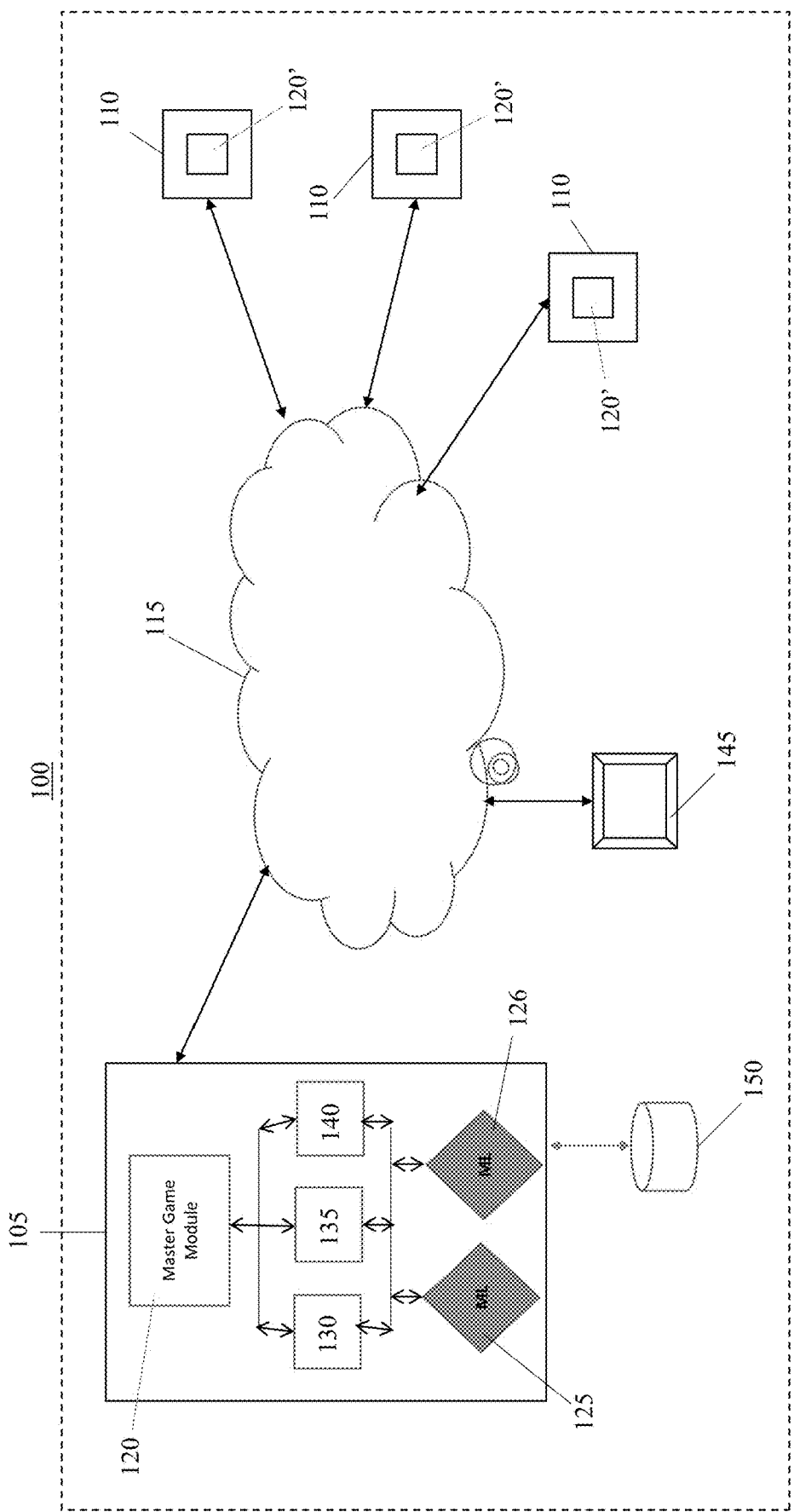
FIG. 1A is a block diagram illustrating a multi-player online gaming system or environment for implementing offensive content classification and search workflows, in accordance with embodiments of the present specification.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "application programming interface (API)" may refer to a set of protocols, routines, functions and/or commands that programmers use to develop software or facilitate interaction between distinct software components or modules.

The term "module" or "component" used in this disclosure may refer to computer logic utilized to provide a desired functionality, service or operation by programming or controlling a general purpose processor. More specifically, a software module or component is a set of programmatic instructions, in the form of routines, functions and/or commands, and may be referred to as a software package, a web service, or a web resource. It encapsulates a set of related functions (or data) and is separated from another software component by at least one API. All of the data and functions inside each component are semantically related (just as with the contents of classes). A component is designed to be substitutable, so that a component can replace another component (at design time or run-time), if the successor component meets the requirements of the initial component, as defined by and expressed by the API(s). Software modules often take the form of objects or collections of objects from object-oriented programming, in some binary or textual form, adhering to some interface description language (IDL) so that the module may exist autonomously from other software modules in a computer. Module may be interchangeably used with unit, logic, logical block, component, or circuit, for example.

The terms "content" and "personal visual symbol data" are used interchangeably throughout the specification.

The term "personal visual symbol" refers to an image, vector or matrix of pixels comprising textual and/or graphical information.

The term "gradient descent" refers to a first-order iterative optimization algorithm used in the machine learning models of the present specification to find values of parameters (coefficients or weights) of a function (f) that minimizes a cost function (cost). Thus, the gradient descent algorithm works toward adjusting input weights of the layers in neural networks and finding local minima or global minima in order to optimize a problem.

The term "stride" refers to the number of pixels a convolution filter shifts over an input matrix of pixels.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

FIG. 1A illustrates an embodiment of a multi-player online gaming system or environment 100 in which offensive content classification/labeling and search workflows of the present specification may be implemented or executed. The system 100 comprises client-server architecture, where one or more game servers 105 are in communication with one or more client devices 110 and at least one administrative work-station 145 over a network 115. Players may access the system 100 via the one or more client devices 110 while at least one administrator may access the system 100 using the at least one work-station 145. The client devices 110 and the work-station 145 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 150. The database system 150 stores a plurality of game data associated with at least one game that is served or provided to the client devices 110 over the network 115. In embodiments, the database system 150 also stores a plurality of training data. In some embodiments, the one or more game servers 105 may be implemented by a cloud of computing platforms operating together as game servers 105.

In accordance with aspects of the present specification, the one or more game servers 105 provide or implement a plurality of modules such as, but not limited to, a master game module 120, machine learning (ML) modules 125 and 126, a training module 135, a content classification module 130 and a content search module 140. In some embodiments, the one or more client devices 110 and the administrative work-station 145 are configured to implement or execute one or more of a plurality of client-side modules that are same as or similar to the modules of the one or more game servers 105. For example, in some embodiments the client devices 110 execute a client-side game module 120'.

The one or more game servers 105 are preferably configured to concurrently communicate with at least 20 client devices, and more preferably 20 to 1,000,000 client devices or any increment therein, such that each of said at least 20 client devices are permitted to concurrently generate, submit, search for, retrieve, and/or index one or more personal visual symbols. In another embodiment, the one or more game servers are configured to concurrently host at least 5 requests to generate, submit, search for, retrieve, and/or index one or more personal visual symbols per second, preferably 50-150 requests to generate, submit, search for, retrieve, and/or index one or more personal visual symbols per second, with the plurality of client devices.

In some embodiments, the administrative work-station 145 executes at least one administrative software application that enables the administrator to interact with the modules 120, 125, 130, 135 and 140 using at least one GUI (Graphical User Interface) over the network 115. In some embodiments, the administrator may interact with the modules 120, 125, 130, 135 and 140 from the work-station 145 using at least one web-based GUI over the network 115. In some embodiments, the administrative work-station 145 also executes the client-side game module 120'.

It should be appreciated that, in one embodiment, the present invention achieves at least some of its desired objectives by having the distinct distribution of modular functionality as shown in FIG. 1A. For example, the administrative work-station executing the administrative software application is preferably modularly distinct from, and physically remote from, one or more of the database 150, machine learning (ML) modules 125 and 126, training module 135, content classification module 130 and content search module 140. Further, in an embodiment, the training module 135, content classification module 130 and content search module 140 are configured to execute in parallel to each other with each in independent communication with a ML module 125, 126 and/or the master game module 120.

Master Game Module 120

In embodiments, the master game module 120 is configured to execute an instance of an online game to facilitate interaction of the users with the game. In embodiments, the instance of the game executed may be synchronous, asynchronous, and/or semi-synchronous. The master game module 120 controls aspects of the game for all players and receives and processes each player's input in the game. In other words, the master game module 120 hosts the online game for all users, receives game data from the client devices 110 and transmits updates to all client devices 110 based on the received game data so that the game, on each of the client devices 110, represents the most updated or current status with reference to interactions of all players with the game. Thus, the master game module 120 transmits game data over the network 115 to the client devices 110 and the work-station 145 for use by the game module 120' to provide local versions and current status of the game to the players and the administrator, respectively.

Game Module 120'

On the client-side, each of the one or more client devices 110 and the administrative work-station 145 implements the game module 120' that operates as a gaming application to provide a player with an interface between the player and the game. The game module 120' generates the interface to render a virtual environment, virtual space or virtual world associated with the game and enables the player to interact in the virtual environment to perform a plurality of game tasks and objectives. The game module 120' accesses game data received from the game server 110 to provide an accurate representation of the game to the player. The game module 120' captures and processes player inputs and interactions within the virtual environment and provides updates to the game server 110 over the network 115.

In embodiments, the game module 120' also implements a content editor software application to enable a player to generate virtual personalized content for self-expression such as, for example, an emblem, mascot, symbol, badge, logo or insignia (hereinafter referred to as a "personal visual symbol"). In various embodiments, the personal visual symbol comprises textual and/or visual (or graphical) content that the player may put on their in-game virtual gear. In some embodiments, the content editor application is available as a feature within the game module 120' application. A player may launch the content editor from the game module 120' while being in-game or offline. In some embodiments, as a consequence of the player creating a personal visual symbol, the content editor generates the personal visual symbol as an image file as well as a plurality of rendering instructions (similar to postscript or scalable vector graphics) associated with the image file (together referred to hereinafter as "personal visual symbol data"). Thereafter, the player-generated personal visual symbol data is uploaded to the server 105 for auditing against a plurality of enforceable guidelines or policies and manage offensive or toxic content within the system 100.

In accordance with aspects of the present specification, the administrator may launch the content editor from the game module 120' on the work-station 145 to generate offensive as well as inoffensive set of personal visual symbol data for training the ML module 125. In alternate embodiments, the work-station 145 may have a copy of the content editor installed as a standalone application (independent of the game module 120'). It should be appreciated that the presence of the game module 120' on the work-station 145 is to enable the administrator to monitor that the rendered game is progressing without technical glitches and to intervene for restoring aspects of the game, if needed.

In embodiments, the offensive and inoffensive personal visual symbol data generated by the administrator comprises a first set of training data for training the ML module 125. In embodiments, a sufficiently large set of offensive and inoffensive personal visual symbol data is generated by the administrator and stored in the database 150. Subsequently, the administrator begins classifying and labeling or ranking the first set of training data. For this, in some embodiments, the administrator may access the content classification module 130 from work-station 145 through the network 115. On access, the content classification module 130 implements a plurality of instructions or programmatic code to generate at least one content classification GUI. The GUI is configured to enable the administrator to query the database for the first set of training data, present each piece of the first set of training data and allow the administrator to associate one of offensive or inoffensive classification to each piece of the first set of training data and also associate a degree of offensiveness label, ranking or score (on a predetermined scale of offensiveness such as, of example, a numerical scale of 1 to 5 where the degree of offensiveness increases from 1 to 5) with the data classified as offensive.

The human-labeled first set of training data is stored in the database 150 for retrieval for the purposes of training the ML module 125.

Machine Learning (ML) Module 125

In accordance with an aspect of the present specification, the ML module 125 executes a plurality of instructions or programmatic code to implement a machine learning model that receives personal visual symbol data as input, processes the personal visual symbol data and outputs a classification and label corresponding to the personal visual symbol data.

In various embodiments, the machine learning model may include one or more support vector machines, linear regression models, clustering analysis models, boosted decision trees, neural networks, deep learning models or a combination thereof. In some embodiments, the machine learning model is a deep learning feed-forward network such as a multilayer convolutional neural network (CNN).

Figure 2:
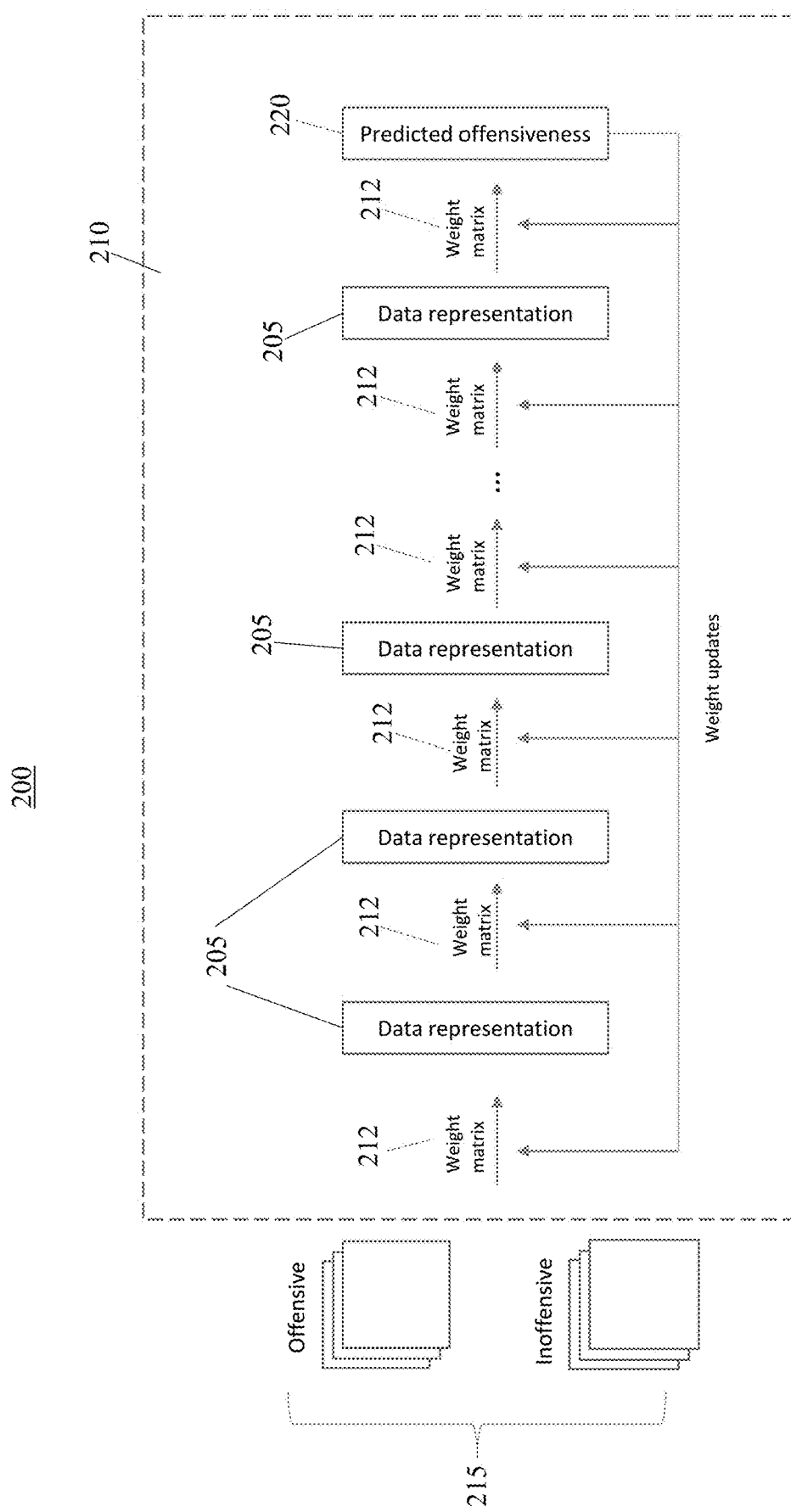
FIG. 2 is a block diagram illustration of a feed-forward machine learning model configured to perform content classification and labeling, in accordance with some embodiments of the present specification.

FIG. 2 is a block diagram illustration of a feed-forward machine learning model 200 configured to perform content classification and labeling, in accordance with some embodiments of the present specification. In one embodiment, the model 200 is a multilayer CNN in which each convolutional layer 205 is connected to every other layer in a feed-forward fashion. In some embodiments, for each layer 205, feature maps of all preceding layers are used as inputs, and its own feature-maps are used as inputs into all subsequent layers 205. Thus, to preserve the feed-forward nature, each layer 205 obtains additional inputs from all preceding layers 205 and passes on its own feature-maps to all subsequent layers 205. In various embodiments, the model 200 comprises a block 210 of 'n' convolutional layers 205 where 'n' is greater than or equal to 3. In some embodiments, the block 210 includes 'n'=12 convolutional layers 205. For processing, content data 215 (offensive and inoffensive) is provided to the model 200 as input and a predicted offensiveness score and classification are received as output at a final classification layer 220. It should be appreciated that, in various embodiments, the input content 215 comprises textual and/or visual (graphical or image) data. In some embodiments, the content 215 is personal visual symbol data.

In embodiments, to facilitate down-sampling, the model 200 is further adapted to include a plurality of blocks 210 separated by pooling transition layers. In some embodiments, for image inputs of 224×224 pixels (for example, resized from 256×256 bitmap images), a 7×7 initial convolutional down-sampling (stride=2) is used followed by a 3×3 max pooling (stride=2) followed by three blocks 210 of 12 convolutional layers each, and finally followed by a global average pooling across channels. In embodiments, an output of the global average pooling is a vector of length 'm'. For example, in an embodiment, where a layer shape (that is, matrix shape) prior to the global average pooling is 14×14×456, the response/output of the global average pooling is a vector of length m=456.

Persons of ordinary skill in the art would understand that each layer 205 of the block 210 has a weight matrix 212 associated therewith that is determined during learning, also referred to as a training stage.

Referring back to FIG. 1A, in the training stage, at least one set of training data (for example, a training set of personal visual symbol data each having a known output) is processed by the ML module 125 to learn how to provide an output for new player-generated input data by generalizing the information the ML module 125 learns in the training stage from the training data. The weight matrices can be adjusted and attuned further based on experience, making the ML module 125 adaptive to inputs and capable of learning.

Training Module 135

Referring now to FIG. 1A, in some embodiments, a training module 135 implements a plurality of instructions or programmatic code to manage and control initial training of the ML module 125. In various embodiments, the training module 135 accesses at least one set of training data from the database system 150, provides the training data (in accordance with a training schedule, for example) as input to the ML module 125 for processing using at least learning algorithm and may also monitor (such as, for example, in case of supervised training) the output generated by the ML module 125.

In embodiments, the database system 150 has stored the first set of training data comprising administrator generated, classified and labeled personal visual symbol data for supervised training. In some embodiments, the database system 150 also stores a second set of training data for unsupervised training. The second set of training data is characterized by the fact that the data is not classified and/or labeled as offensive or inoffensive. In some embodiments, the second set of training data may comprise unlabeled or unclassified player generated personal visual symbol data existing in the database 150 prior to implementing the toxicity detection methods of the present specification. In some embodiments, the database system 150 also optionally stores a third set of training data for supervised training. In some embodiments, the first, second and third sets of training data are stored in separate schemas of the database system 150. In some embodiments, the training module 135 implements a training schedule wherein the ML module 125 is trained using the first set of training data (for supervised training). In some embodiments, the training module 135 implements a training schedule wherein the ML module 125 is trained using the second set of training data (for unsupervised training) followed by the first set of training data (for supervised training). In some embodiments, the training module 135 implements a training schedule wherein the ML module 125 is trained using the second set of training data (for unsupervised training), followed (optionally) by the third set of training data (for supervised training) and finally using the first set of training data (for supervised training).

In embodiments, the first set of training data comprises a plurality of human-labeled and classified personal visual symbol data having textual and/or image (or graphical) content. In other words, each piece of the personal visual symbol data has a known output—that is, is already classified as offensive or inoffensive, wherein the offensive content is also labeled with a degree of offensiveness.

In embodiments, the training module 135 presents the first set of training data to the ML module 125 for processing, as part of supervised training. Supervised training comprises enabling the ML module 125 to learn a function that maps one or more inputs (first set of training data) to one or more known outputs (human labeled and classified). Since the outputs for each of the first set of training data is already known, a learning algorithm of the ML module 125, for supervised learning, iteratively makes predictions on the first set of training data and is corrected by a feedback from the training module 135 when the predictions are off with respect to the known outputs.

The learning algorithm analyzes the first set of training data and produces an inferred function, which can be used for mapping new content. An optimal scenario allows for the algorithm to correctly determine the classification and labels for unseen or new content. This requires the learning algorithm to generalize from the first set of training data to unseen situations. In various embodiments, the learning algorithm is a gradient descent algorithm. In some embodiments, the learning algorithm is a stochastic gradient descent. In some embodiments, the learning algorithm is a batch gradient descent. In some embodiments, the learning algorithm is a mini-batch gradient descent. The goal of the gradient descent algorithm is to find parameters (for example, coefficients or weights) that minimize an error of the ML model 125 on the first set of training dataset. The algorithm does this by making changes to the parameters that move it along a gradient or slope of errors down toward a minimum error value.

As described earlier, the first set of training data, human-labeled and classified, comprises personal visual symbol data—that is, personal visual symbol image files and rendering instructions associated with each of the image files. Thus, a personal visual symbol image in the first set of training data is also represented by rendering instructions (together with or instead of a vector/matrix of pixels) such as, for example, "place Symbol 1 at location (100, 100) with scale 1.0 and rotation 0.25; place Symbol 2 at location (100, 100) with scale 1.0 and rotation 0.75". The following is an exemplary set of rendering instructions, representing a personal visual symbol image, with a plurality of layers providing instructions (similar to postscript or scalable vector graphics) on how the personal visual symbol image should be rendered in-game:

```
"personal visual symbol": {
    "image": {
        "layers": [
            {
                "iconID": 294,
                "materialID": 255,
                "colorLinearSrgb": {
                    "r": 46,
                    "g": 25,
                    "b": 0,
                    "a": 255
                },
                "color1LinearSrgb": {
                    "r": 46,
                    "g": 25,
                    "b": 0,
                    "a": 255
                },
                "pos_x": 127,
                "pos_y": 127,
                "scale_x": 117,
                "scale_y": 127,
                "angle": 0,
                "materialPos_x": 127,
                "materialPos_y": 127,
                "materialScale_x": 127,
                "material Scale_y": 127,
                "materialAngle": 0,
                "gradientAngle": 0,
                "gradientOffset": 127,
                "gradientSpread": 127,
                "mode": 8,
                "outline": false,
                "flip": false,
                "blend": false,
```

-continued

```
                "linearGradient": false,
                "editorType": 4
            },
            ...
        ]
    }
}
```

In accordance with some aspects of the present specification, instead of rendering the instructions data to a vector of pixels (such as, for example, a PNG or JPEG file) and presenting the vector of pixels to the ML module 125 for training/learning, the rendering instructions for each image (in the first set of training data) is directly fed as input to the ML module 125 for training. This enables the ML module 125 to learn that, for example, a set of instructions, having a plurality of text strings in a certain configuration, represents a negative racial symbol such as a swastika. Using the rendering instructions as input for training has a benefit of circumventing the need to render the instructions to a pixel array. This would enable having direct access to textual data (either standalone or in combination with graphical data) without requiring to OCR (Optical Character Recognition) and a simplified data representation since there are 256^ (256*256*3) unique pixel vectors that can be created whereas there are probably far fewer unique representations using rendering instructions.

In some embodiments, rendering instructions in the first set of training data are fed directly to the ML module 125 for training. In some embodiments, both personal visual symbol image (vector of pixels) and rendering instructions in the first set of training data are fed directly to the ML module 125 for training. In some embodiments, personal visual symbol images (vector of pixels) in the first set of training data are fed to the ML module 125 for training and generation of learning features/feature vectors that enable the ML module 125 to recognize textual words as a function of the training task. In some embodiments, textual data is extracted (such as by using optical character recognition (OCR)) and is fed in combination with pixel data to the ML module 125 for training.

In some embodiments, the training module 135 augments supervised training by accessing the third set of training data from the database 150 and presenting to the ML module 125 for processing. The third set of training data comprises one or more classified and/or labeled publicly available open datasets (of image and textual content) such as, but not limited to, MNIST, MS-COCO, ImageNet, Open Images, VisualQA, CIFAR-10, CIFAR-100, Sentiment Labeled Sentences Dataset, and SNLI Corpus.

After supervised training, in some embodiments, the training module 135 accesses the second set of training data from the database 150 and presents to the ML module 125 for processing, as part of unsupervised training. Unsupervised training enables the ML module 125 to learn from the second set of training data that has not been labeled, classified or categorized. Instead of responding to feedback from the training module 135, unsupervised learning identifies commonalities in the training data and reacts based on the presence or absence of such commonalities in each piece of training data. A learning algorithm for unsupervised learning is left to itself to discover and present the underlying structure in the training data. In some embodiments, the learning algorithm of the ML module 125, for supervised learning, is gradient descent based (such as, stochastic, batch and mini-batch) with a modified cost function that includes a term such as, but not limited to, an input reconstruction term, a term based on the joint distribution between inputs and learned variables, or an adversarial term. In some embodiments, the learning algorithm of the ML module 125, for unsupervised learning, includes Hebbian learning.

Figure 3:
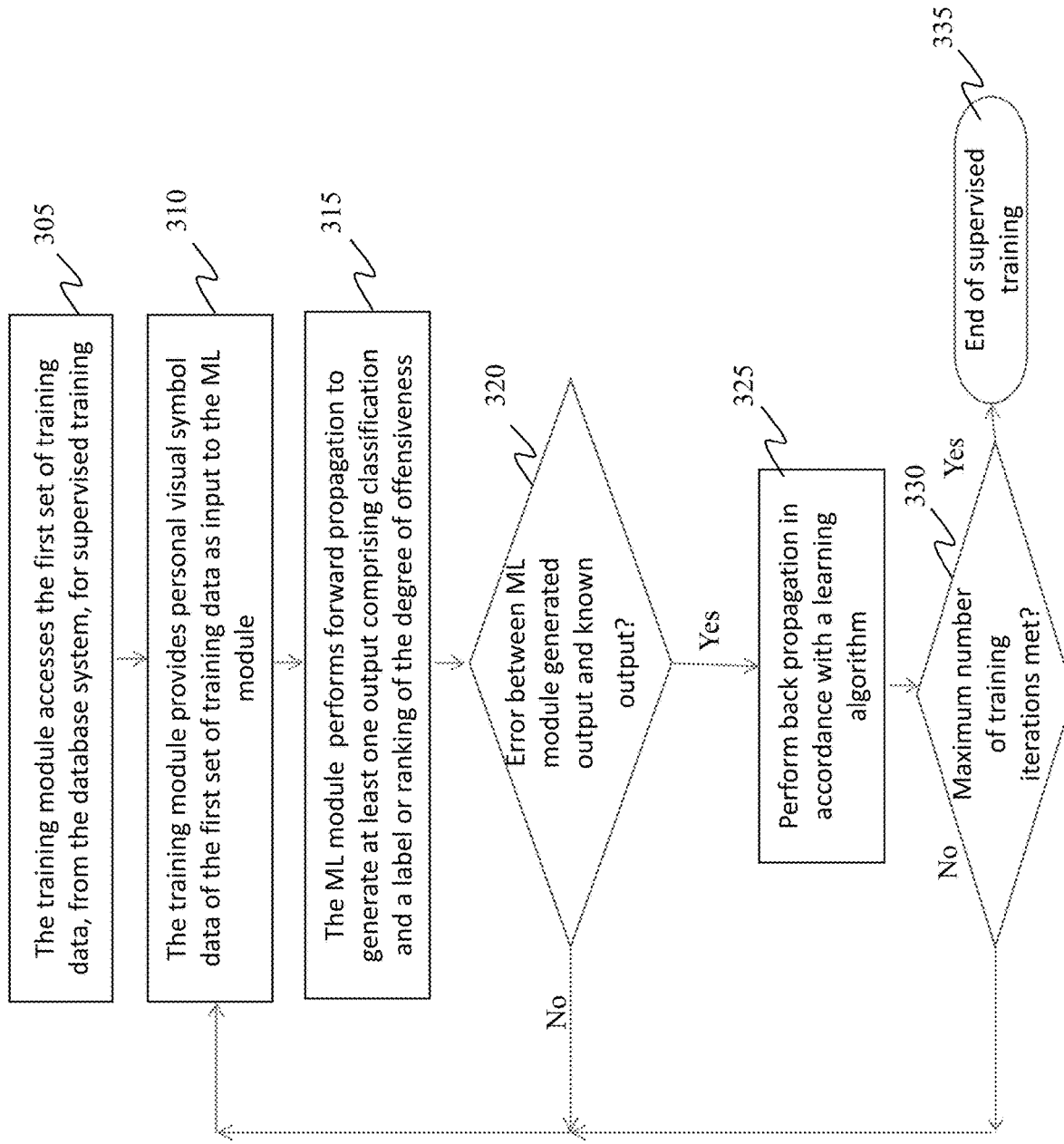
FIG. 3 is a flowchart illustrating a plurality of exemplary steps of implementing a method of training the machine learning model of FIG. 2, in accordance with some embodiments of the present specification.

FIG. 3 is a flowchart illustrating a plurality of exemplary steps of implementing a method of training the ML module 125, in accordance with some embodiments of the present specification. Referring now to FIGS. 1A and 3, at step 305, the first set of training data is accessed by the training module 135, from the database system 150 for supervised training of the ML module 125. At step 310, the training module 135 provides sample personal visual symbol data of the first set of training data as input to the ML module 125 that in some embodiments is a convolutional neural network (CNN) in which each convolutional layer is connected to every other layer in a feed-forward fashion. In some embodiments, the personal visual symbol data comprises personal visual symbol image file or vector of pixels and associated rendering instructions. In some embodiments, the personal visual symbol data includes only the rendering instructions associated with a personal visual symbol image file or vector of pixels.

At step 315, as a result of the input personal visual symbol data, the ML module 125 performs forward propagation to generate at least one output comprising offensive/inoffensive classification and a label or ranking of the degree of offensiveness in case of an offensive classification. At step 320, the training module 135 determines an error between the generated output and the known output of the sample personal visual symbol data (since the personal visual symbol data is human-labeled for supervised training).

If the output is incorrect then, at step 325, in accordance with a learning algorithm—back propagation is performed according to the difference between the generated output and the known output to correct parameters (such as, for example, the coefficients or weight matrices) of the ML module 125. If the output is correct, then the flow moves back to step 310 to continue inputting personal visual symbol data to the ML module 125 for processing.

In some embodiments, the learning algorithm is stochastic gradient descent that calculates the error and updates the parameters of the ML module 125 for each sample in the first set of training data. In some embodiments, the learning algorithm is batch gradient descent that calculates the error for each sample in the first set of training data, but only updates the parameters of the ML module 125 after all training examples have been evaluated. In some embodiments, the learning algorithm is mini-batch gradient descent that splits the first set of training data into small batches that are used to calculate the error and update the ML module 125 parameters.

At step 330, the training module 135 determines if the ML module 125 has gone through a predefined maximum number of training iterations or passes using the first set of training data. If the predefined maximum number of training iterations are met then, at step 335, the training ends else the flow control moves back to step 310. In some embodiments, the training module 135 may additionally determine if an error rate of the ML module 125, on the first set of training data, reaches or is lower than a predetermined value. If the predetermined error rate is met prior to the ML module 125 completing the predefined maximum number of training iterations then the training module 135 may employ "early stopping" of the training at step 335.

At step 330, the training module 135 determines if an error rate of the ML module 125, on the first set of training data, reaches or is lower than a predetermined value. If the predetermined value is met then, at step 335 the training ends else the flow control moves back to step 310.

In some embodiments, the training module 135 augments the supervised training steps 310 to 335 by accessing the third set of training data from the database 150 and presenting to the ML module 125 for processing. As discussed earlier in the specification, the third set of training data comprises one or more classified and/or labeled publicly available open datasets (of image and textual content).

In some embodiments, prior to supervised training (using the first set of training data followed by the third set of training data), the training module 135 accesses the second set of training data from the database 150 and presents to the ML module 125 for processing, as part of unsupervised training.

In embodiment, the training process results in a trained ML module 125' that includes various processing layers, each with a learnt weight matrix. The trained ML module 125' takes as input a representation of player-generated personal visual symbol data (for example, a matrix or vector of pixels and/or associated rendering instructions) and passes the representation through a plurality of transforms such as, but not limited to, edge detection, shape detection, and compression. Each transformation enables the trained ML module 125' to better understand what the personal visual symbol data represents/contains and ultimately classify the personal visual symbol data and predict its offensiveness.

In some embodiments, once training is complete, a validation dataset is processed by the trained ML module 125' to validate the results of training/learning. Finally, player-generated personal visual symbol data (for which generating an output is desired) can be processed by a validated and trained ML module 125' and the results stored in the database system 150.

Content Classification Module 130

In embodiments, the player-generated personal visual symbol data (uploaded to the server 105 and stored in the database system 150) is accessed or queried by the content classification module 130 to initiate processing by the trained ML module 125'. In accordance with aspects of the present specification, the content classification module 130 implements a plurality of instructions or programmatic code to manage processing of the player-generated personal visual symbol data, for detecting offensive content, using the trained machine learning (ML) module 125. In some embodiments, the classification module 130 provides the player-generated personal visual symbol data as input to the trained ML module 125', also referred to as a trained classification module, that processes the player-generated personal visual symbol data and outputs a classification and label corresponding to the personal visual symbol data. In some embodiments, only the personal visual symbol image file is provided as input to the trained ML module 125'. In some embodiments, only the rendering instructions (associated with the personal visual symbol image file) are provided as input to the trained ML module 125'. In some embodiments, where only the personal visual symbol image file is input to the trained ML module 125', the personal visual symbol image file is subjected to a plurality of pre-processing functions (for image data augmentation) such as, but not limited to, shifting, zooming, rotating by up to, for example, 20% with random horizontal flips.

In some embodiments, the content classification module 130 assigns a value to the player-generated personal visual symbol data based on the classification and label output by the trained classification module, wherein the value is indicative of whether the player-created personal visual symbol data is or is not permissible. An action is then applied to the player-created personal visual symbol based on the value. In some embodiments, the action includes at least one of permitting the player-created personal visual symbol to be used in a multi-player gaming network or prohibiting the player-created personal visual symbol from being used in a multi-player gaming network. In some embodiments, the multi-player gaming network automatically applies the action to the player-created personal visual symbol based upon the value without human intervention.

In embodiments, the classification parameter predicts whether the personal visual symbol is offensive or not while the label parameter predicts a degree of offensiveness or toxicity of the personal visual symbol. In some embodiments, the degree of offensiveness is embodied as a score, for example, on a predefined scale. For example, the predefined scale may be a 1 to 5 numerical scale where the degree of offensiveness increases from 1 to 5 (1 being the lowest and 5 being the highest degree of offensiveness). In some embodiments, the degree of offensiveness may determine whether the player (who generated the offensive personal visual symbol) is permanently or temporarily banned from participating in the gaming system 100 in accordance with content enforcement policies and guidelines. In some embodiments, a player may be the original creator of an offensive personal visual symbol and may share the symbol with one or more other players. In such circumstances, the player who is the original creator of the symbol may be permanently banned while the one or more other players may be subject to a temporary ban. A permanent ban means that the video game is configured to prevent or stop the player from engaging in gameplay by 1) blocking a hardware address associated with the player, 2) blocking a network address associated with the player, 3) deleting or deactivating an account associated with the player, 4) prohibiting the player from re-entering the game based on his or her user identification, or 5) prohibiting the player from rejoining the game under a different user identification if the player name, network address, and/or hardware address is the same as the banned player's corresponding data. A temporary ban is technically similar to the permanent ban except subject to a predefined time period, such as one day, one week, one month, or one year or any time increment therein.

The following are exemplary offensiveness criteria and associated type of enforcement:
  Degree of offensiveness score of 1 to 3 (on the scale of 1 to 5)—minor enforcement leading to temporary ban of the player. The score of 1 to 3 being indicative of offensive imagery containing, for example, sexually explicit images and/or foul language;
  Degree of offensiveness score of 4 or 5 (on the scale of 1 to 5)—major enforcement leading to permanent ban of the player. The score of 4 or 5 being indicative of content depicting racism, bigotry, and/or discriminatory or hateful imagery, for example.

In some embodiments, the content classification module 130 enables automatic enforcement (permitting or prohibiting the personal visual symbol in the multi-player gaming network) as a consequence of the classification and labeling output by the trained ML module 125' without further human intervention. In some embodiments, the content classification module 130 enables the administrator to audit and verify the classification and labeling output by the trained ML module 125'. In some embodiments, the content classification module 130 enables supervised enforcement as a consequence of the classification and labeling output by the trained ML module 125'.

In some embodiments, the content classification module 130 implements a plurality of instructions or programmatic code to generate at least one verification GUI. In some embodiments, the verification GUI is accessible to the administrator from his work-station 145 through the network 115. In embodiments, the verification GUI enables the administrator to query the database system 150 for player-generated personal visual symbol data processed by the ML module 125 during a specified period of time (for example, the administrator may query for personal visual symbol data generated by all players and processed by the ML module 125 during the last one week), enables the queried player-generated personal visual symbol data to be presented to the administrator along with the associated classification and labeling as a result of processing by the ML module 125, enables the administrator to audit and verify if the classification and labeling is accurate for each of the player-generated personal visual symbol data, enables the administrator to attach his verification feedback to the classification and labeling for each of the player-generated personal visual symbol data wherein the verification feedback is indicative of whether the classification and labeling is correct or erroneous along with a correct classification and labeling in case of erroneous processing by the ML module 125, and enables saving the administrator audited and verified personal visual symbol data to the database system 150.

In some embodiments, the queried player-generated personal visual symbol data is presented to the administrator (along with the associated classification and labeling) using active learning techniques (such as, for example, uncertainty sampling) for administrator training and performance evaluation.

In accordance with aspects of the present specification, once the administrator-audited and verified personal visual symbol data is saved to the database system 150, the content classification module 130 issues an event flag to the training module 135. As a result, the training module 135 queries the database system 150 for administrator verified and classified and labeled personal visual symbol data and feeds the data to the ML module 125 for continuous supervised training/learning and improvement of the ML module 125.

In some embodiments, the content classification module 130 implements a plurality of instructions or programmatic code to generate at least one enforcement GUI. In some embodiments, the enforcement GUI enables the administrator to query the database system 150 for administrator-audited and verified personal visual symbol data during a specified period of time and having a specified associated classification and labeling. For example, the administrator may use the enforcement GUI to query and consequently view all player-generated personal visual symbol data that have been audited and verified by the administrator over a period of time, e.g. the last one day, week, or month, and that have been verified by the administrator to be offensive. Depending upon the labeling or ranking indicative of the degree of offensiveness, the administrator may attach temporary or permanent enforcement tags to the corresponding personal visual symbol data. Thereafter, the enforcement tags are saved to the database system 150. In some embodiments, once the enforcement tags are saved to the database system 150, the content classification module 130 issues an event flag to the master gaming module 120 that executes a plurality of programmatic instructions to implement the enforcements within the system 100. In some embodiments, the content classification module 130 may itself be configured to implement the enforcements within the system 100.

Additionally, in some embodiments, once the enforcement tags are saved to the database system 150, the content classification module 130 also issues an event flag to the training module 135. As a result, the training module 135 queries the database system 150 for enforcement tagged personal visual symbol data and feeds the data to the ML module 125 for continuous supervised training/learning and improvement of the ML module 125.

In various embodiments, the player-generated personal visual symbol data presented to the administrator, via verification and/or enforcement GUIs, may be biased. For example, the ML module 125 may be adept at detecting certain personal visual symbols, e.g., swastikas, and thus tend to identify and present swastikas to the administrator for potential enforcement. The administrator reviewing the results would confirm the swastikas are offensive (in accordance to content policies and guidelines) thereby reinforcing the existing learning of the ML module 125 to continue to identify and present swastikas. This may lead to training the ML module 125 to do something that is already good at, as opposed to becoming more adept at identifying other offensive imagery.

In embodiments, in order to mitigate this biasing problem, the training module 135 and/or the content classification module 130 implements a plurality of programmatic instructions or code to a) inject (based on some heuristic) textual and/or image (graphical) content not predicted to be offensive into the results exposed or presented to the administrator via the verification and/or enforcement GUIs (for example, for every 1000 predicted offensive images presented for review, 50 random images are included as well) and/or b) modify the ML model 125 to penalize personal visual symbol data that the module 125 is already confident in so that a more diverse dataset is presented to the administrator.

In various other embodiments, the biasing problem may be mitigated using methods such as, but not limited to, sample set bias correction using an auxiliary model, hard example mining, and/or incorporating unsupervised metrics into the cost function.

Sample set bias correction using an auxiliary model: This approach to correcting sampling bias is directed towards recovering the data distributions of the training and validation data and then performing corrections based on the distribution estimates. In some embodiments of the present specification it is desirable to recover the data distribution of biased labeled data and the data distribution of an unbiased sample of all data for correction. It should be appreciated that this approach works for low-dimensional feature spaces and typically the CNN model of the present specification reduces the dimensionality of data. However, it is desirable for the CNN model of the present specification to be unbiased. A solution is to use, in some embodiments, an auxiliary CNN model trained on an unbiased dataset (either publicly available, or trained in an unsupervised manner on an unbiased sample of data).

Hard example mining: This approach of dealing with data imbalance is directed towards weighing the cost of examples proportional to their representation in the data. This works when the data classes are known, but in dealing with "within-class imbalance" (that is, bias), it is required to determine which examples are overrepresented. A solution is to use hard example mining, in some embodiments, which uses the CNN model's cost function to determine the "difficulty" of each example, which can then be used to adjust the effective cost through repetition of hard examples or omission of easy examples.

Figure 1B:
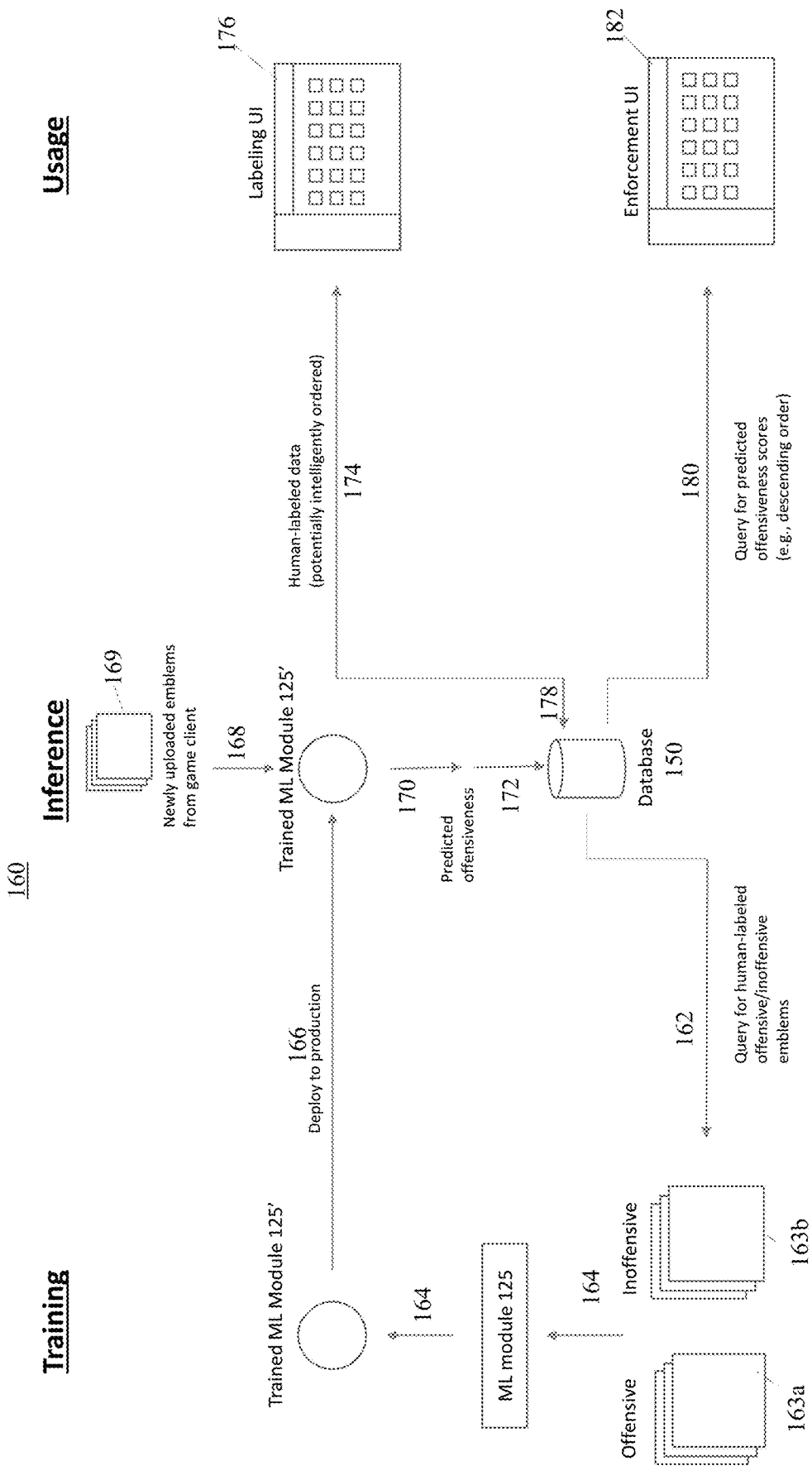
FIG. 1B illustrates a workflow implemented on the system of FIG. 1A for classifying and labeling offensive content, in accordance with some embodiments of the present specification.

FIG. 1B illustrates a workflow 160 implemented on the system 100 of FIG. 1A for detecting, classifying and labeling offensive content, in accordance with some embodiments of the present specification. Referring now to FIGS. 1A and 1B, at step 162 the training module 135 queries the database system 150 to access a plurality of training datasets such as the first, second and third sets of training data. In embodiments, the first and third set of training data are human-labeled for supervised training while the second set of training data is unlabeled and unclassified for unsupervised training. At step 164, the training module 135 implements supervised and unsupervised training of the ML module 125 using the first, second and third sets of training data. For supervised training, the first and third sets of training data comprise a plurality of human-labeled offensive content 163*a* and inoffensive content 163*b*. In some embodiments, the content 163*a*, 163*b* comprises personal visual symbol data. Output of the supervised and unsupervised training is the trained ML module 125' that, at step 166, is deployed for use within the system 100.

At step 168, the content classification module 130 presents a plurality of player-generated personal visual symbol data 169 to the trained ML module 125' for classification and labeling in terms of being offensive/inoffensive and a ranking or score indicative of a degree of offensiveness. At step 170, the trained ML module 125' processes the player-generated personal visual symbol data 169 and predicts offensive/inoffensive classification along with a degree of offensiveness as output. At step 172, the output of the trained ML module 125' along with the corresponding player-generated personal visual symbol data 169 is saved in the database system 150. In some embodiments, the plurality of player-generated personal visual symbol data 169 may first be saved to the database system 150 and later presented to the trained ML module 125' for processing and the resulting output is again saved to the database system 150.

At step 174, at least one administrator queries the database system 150 for verification of the classification and labeling (of the player-generated personal visual symbol data 169) by the trained ML module 125'. The queried personal visual symbol data is presented to the administrator in at least one verification GUI 176. The verification GUI 176 enables the administrator to audit and verify if the classification and labeling is accurate for each of the player-generated personal visual symbol data, enables the administrator to attach his verification feedback to the classification and labeling for each of the player-generated personal visual symbol data wherein the verification feedback is indicative of whether the classification and labeling is correct or erroneous along with a correct classification and labeling in case of erroneous processing by the trained ML module 125'. At step 178 the administrator-audited and verified personal visual symbol data is saved to the database system 150. In embodiments, the administrator audited and verified personal visual symbol data is also available for querying at step 162 for the purposes of supervised training.

At step 180, at least one administrator queries the database system 150 for enforcement of predefined policies and guidelines with respect to offensive/inoffensive player-generated personal visual symbol data classified and labeled by the trained ML module 125'. In some embodiments, enforcement is implemented using the player-generated personal visual symbol data that has also been audited and verified by the administrator (at step 174). The queried personal visual symbol data is presented to the administrator in at least one enforcement GUI 182. The enforcement GUI 182 enables the administrator to attach or associate temporary or permanent enforcement tags to the corresponding personal visual symbol data depending upon whether the personal visual symbol data is classified as offensive and based on the degree of offensiveness of the personal visual symbol data. Thereafter, the enforcement tags are saved to the database system 150 for subsequent enforcement and for supervised training at step 162.

Personal Visual Symbol Search Function

Figure 4:
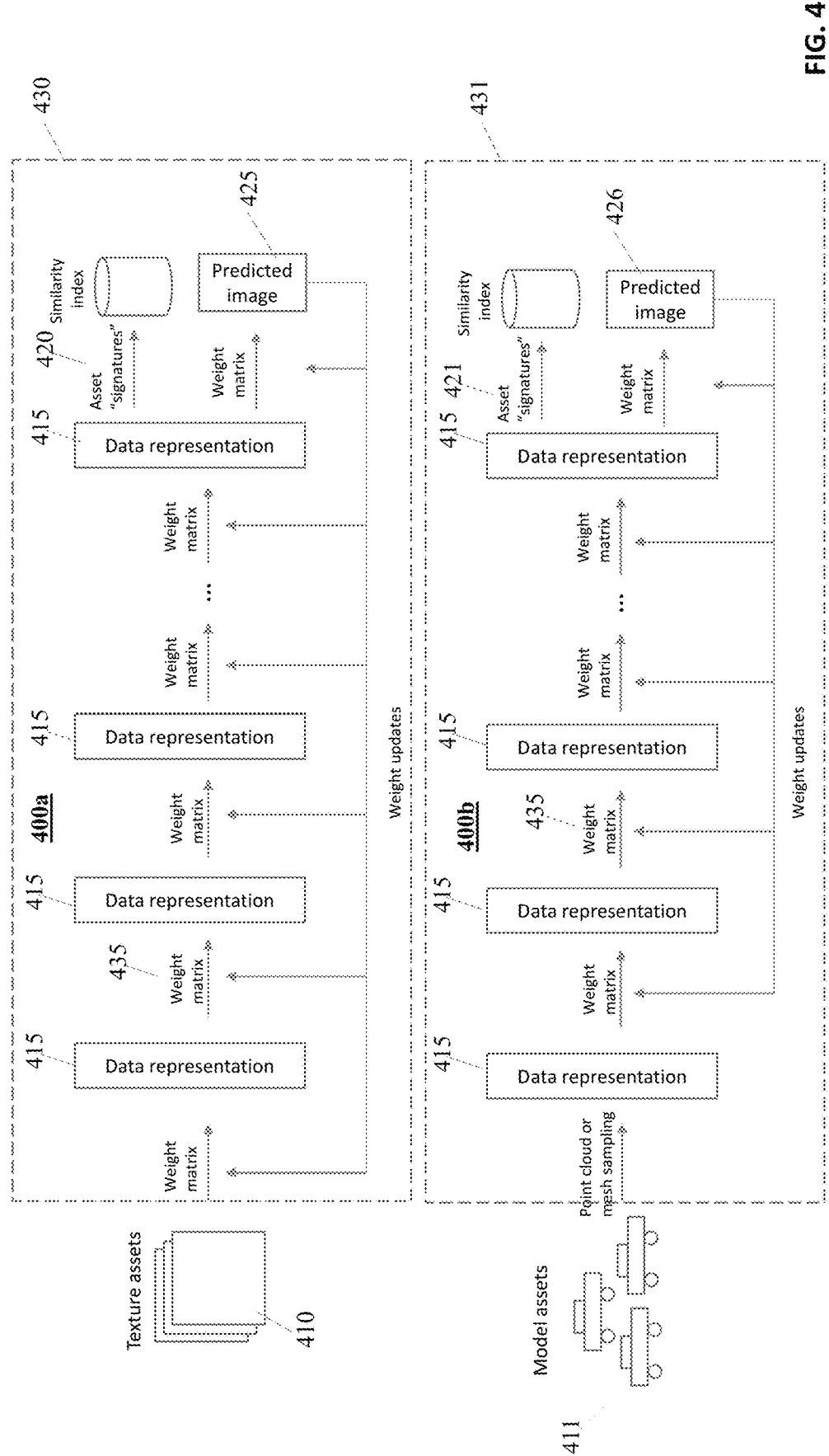
FIG. 4 illustrates block diagrams of first and second feed-forward machine learning models configured to perform offensive content search, in accordance with some embodiments of the present specification.

FIG. 4 illustrates block diagrams of first and second feed-forward machine learning models configured to perform content search or reverse search, in accordance with some embodiments of the present specification. Referring to FIGS. 1A and 4, in accordance with an aspect of the present specification, the ML module 126 executes a plurality of instructions or programmatic code to implement first and second machine learning models 400a, 400b that respectively receive 2D (two dimensional) texture data 410 and 3D (three dimensional) model data 411 as input data, process the input data through a plurality of convolutional layers 415 and output "signatures" 420, 421 representative of the input data and predicted images 425, 426 similar to the "signatures" 420, 421, wherein the predicted images 425, 426 (that the models 400a, 400b find similar to the inputs 410, 411) are queried and accessed by the models 400a, 400b from the database system 150. Alternatively, in some embodiments, personal visual symbol classification/labeling as well as search are performed by the same model—that is, by the model 200 of FIG. 2. In such embodiments, a cost function of the model 200 of FIG. 2 is modified to incorporate a visual similarity term to enable the model 200 to perform the search functionality.

In some embodiments, for each layer 415, feature maps of all preceding layers are used as inputs, and its own feature-maps are used as inputs into all subsequent layers 415. Thus, to preserve the feed-forward nature, each layer 415 obtains additional inputs from all preceding layers 415 and passes on its own feature-maps to all subsequent layers 415. In various embodiments, the models 400a, 400b respectively comprise blocks 430, 431 of 'n' convolutional layers 415 where 'n' is preferably equal to or greater than 3. In some embodiments, 'n'=12. In embodiments, the models 400a, 400b are further adapted to respectively include a plurality of blocks 430, 431 separated by pooling transition layers. Persons of ordinary skill in the art would understand that each layer 415 of the blocks 430, 431 has a weight matrix 435 associated therewith that is determined during learning, also referred to as a training stage.

In some embodiments, the 2D texture data comprise a matrix or vector of pixel values. Accordingly, assets in the form of 2D texture data are stored in the form of datasets comprising a plurality of matrices or vectors, each comprising pixel values. In some embodiments, the 3D model data comprise point cloud or mesh representation of 3D image content where the mesh representation comprises a collection of vertices, edges and faces that define the shape of a polyhedral object. The faces usually consist of triangles (triangle mesh), quadrilaterals, or other simple convex polygons, since this simplifies rendering, but may also be composed of more general shapes, concave polygons, or polygons with holes. Accordingly, assets in the form of 3D image content are stored in the form of datasets comprising a plurality of related or connected vertices, edges and faces that define the shape of a polyhedral object, with points therein comprising pixel values. In embodiments, the term "signature" refers to a vector or matrix of numbers of length 'ln'. For example, in the first and second machine learning models 400a, 400b, "structures" 420, 421 refer to vectors of numbers of length 'm'=456, representing global average pooled responses of each input data 410, 411. A signature, also referred to as a feature vector, is a visual characteristic or element, short of an entire image, that is indicative of certain types of assets, such as offensive, copyrighted, or otherwise prohibited content.

In embodiments, training of the models 400a, 400b is managed by the training module 135. In embodiments, the training module 135 queries the database system 150 that stores a plurality of indexed 2D texture and 3D model data 410, 411. The plurality of indexed 2D texture and 3D model data 410, 411 is fed as input to the models 400a, 400b to generate output signatures that are used by the models 400a, 400b to query (from the database system 150) and predict images 425, 426 similar to the input. In some embodiments, the models 400a, 400b query and search images 425, 426 (similar to the input data 410, 411) using a metric such as L2 (Euclidean) distance or cosine angle. For example, for an L2 index comprising A:[0,0,1], B:[1,0,1] and C:[0,1,1] a query of [0,0.0.9] would return A as most similar. Thereafter, the training module 135 determines whether the predicted images are correct or erroneous. If erroneous, the models 400a, 400b re-configure their parameters, such as coefficients and weights 435, using a gradient descent algorithm such as stochastic, batch or mini-batch.

Content Search Module 140

In embodiments, the content search module 140 manages reverse search function using the first and second machine learning models 400a, 400b that have been trained. To initiate reverse search—that is, to search 2D and/or 3D personal visual symbol data similar to input 2D and/or 3D content—the content search module 140 provides 2D/3D content as input to the models 400a, 400b, obtains the signatures 420, 421 output by the models 400a, 400b and stores the signatures 420, 421 in relation to the input content in the database system 150. The content search module 140 also directs the models 400a, 400b to query the database system 150 to search player-generated personal visual symbol data similar to the input content and present the queried output on at least one GUI.

In accordance with aspects of the present specification, a data structure is used to store $n^2$ pairwise similarities where n is of the order of tens of millions. In embodiments, the data structure includes structures such as, but not limited to, k-d tree (a binary search tree where data in each node is a k-dimensional point in space) and learned hash map. In some embodiments, the system of the present specification uses learned quantization of 'm' dimension vectors to 'n' dimensions and stores them in an inverted index (referred to hereinafter as a "similarity index"). In some embodiments, 'm'=456 and 'n'=64. In various embodiments, the similarity index is stored in a logical partitioned space within the database system 150. In alternate embodiments, the similarity index is stored in another database system 150' co-located and in data communication with the database system 150 or, alternately, located remotely from the database system 150.

Thus, using the trained models 400a, 400b the content search module 140 enables personal visual symbol search to identify offensive player-generated personal visual symbol data or content (and quickly enforce content policies and guidelines) that may not have shown up in the top N results upon querying the database system 150, but are visually similar to some known example. For example, the models 400a, 400b may be used to search for certain types of personal visual symbols (for example, find all swastikas, and find all foul language) or reverse search based on a personal visual symbol (find all personal visual symbols similar to an offensive one). In some embodiments, the models 400a, 400b query and search player-generated personal visual symbol data, similar to the input 2D/3D content, using a metric such as L2 (Euclidean) distance or cosine angle.

Figure 5:
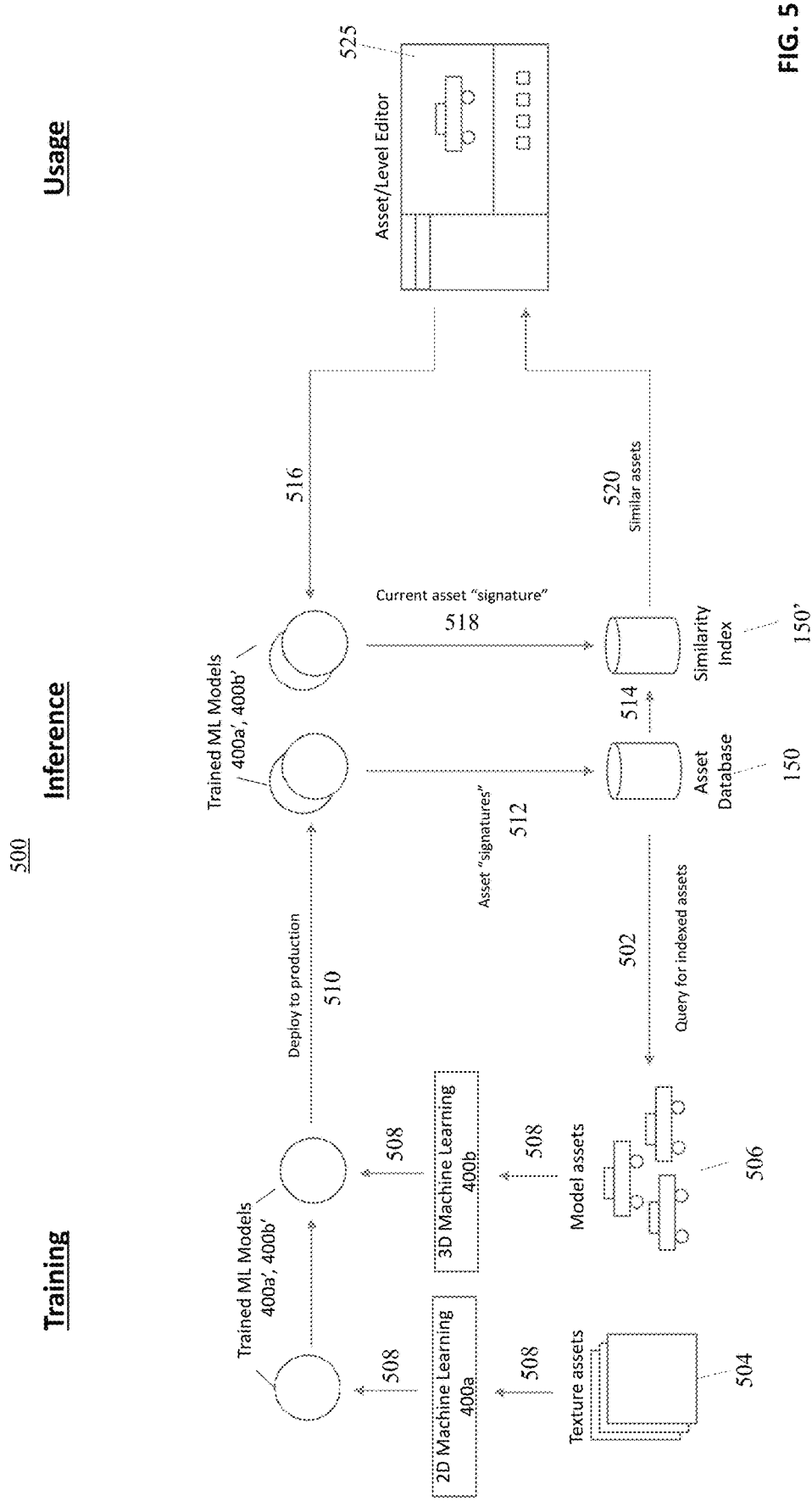
FIG. 5 illustrates a workflow implemented on the system of FIG. 1A for searching offensive content, in accordance with some embodiments of the present specification.

FIG. 5 illustrates a workflow 500 implemented on the system 100 of FIG. 1A for searching visual assets, including filtered or offensive content, in accordance with some embodiments of the present specification.

Referring to FIGS. 1A and 5, a user (such as a system administrator, for example) uses the administrative workstation 145 to access the server 105 and initiate a content search via content search module 140. In embodiments, the content search module 140 presents the user with an asset search GUI 525 over the network 115. In embodiments, the user interacts with the GUI 525 to initiate a search for assets similar to one or more 2D and/or 3D target personal visual symbols.

At step 516, the user, via GUI 525, inputs search criteria, in the form of image data, rendering instructions, textual descriptions, keywords, or other data, and the inputted search criteria is transmitted, by the content search module 140, to the trained models 400a', 400b' that generate corresponding target asset signature(s). Preferably, the input search criteria is in the form of at least one of image data or rendering instructions. In one embodiment, the input search criteria is in the form of image data and the content search module 140 translates the image data into a plurality of rendering instructions, in alphanumeric form, that is then inputted into the trained models 400a', 400b'

At steps 512, 518, the trained models 400a', 400b' generate, in response to the search criteria, a plurality of asset signatures representative of the inputted search criteria and queries an asset database and/or similarity index to determine if the queried of asset signatures are already stored and retrieve images or personal visual symbols associated with, or embodying, the queried asset signatures. More specifically, a database 150 of asset signatures is queried with the signatures determined from the inputted search query. Identified asset signatures that correspond to the search query are then inputted 514 into a similarity index to find all images or personal visual symbols that embody, or would be considered visually similar to, the identified asset signatures. The identified images or personal visual symbols are then communicated 520 back to the content search module 140 and GUI 525 for viewing by the user. In some embodiments, the searches are performed using a metric such as L2 (Euclidean) distance or cosine angle. In some embodiments, the database system 150' is co-located and in data communication with the database system 150 or, alternately, located remotely from the database system 150. Alternately, in some embodiments, the similarity index is stored in a logical partitioned space within the database system 150.

The plurality of asset signatures, stored in the asset database 150, are generated from a training system that acquires 2D texture assets 504 and 3D model assets 506. In one embodiment, the 2D texture assets 504 and 3D model assets 506 are maintained in logically separated data structures. In some embodiments, the assets 504, 506 are human-indexed or labeled for supervised training. In some embodiments, the texture and model assets 504, 506 are respectively 2D and 3D personal visual symbol data. At step 508, the training module 135 implements supervised training 508 of the first and second machine learning models 400a, 400b (ML module 126) using the assets 504, 506, respectively. Output of the supervised training constitutes the trained models 400a', 400b' that, at step 510, are deployed for use within the system 100, as discussed above.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for indexing digital media and extracting one or more signatures of the digital media to enable a search of personal visual symbols in a multi-player gaming network, wherein the multi-player gaming network comprises at least one game server and a plurality of client devices in data communication and located remote from each other, the method comprising:
   generating, using a content search module stored locally in at least one of the plurality of client devices, a user interface through which a user may input search criteria for one or more digital media;
   receiving, in the at least one game server, the search criteria from the content search module;
   transforming, in the at least one game server and using a content classification module, the search criteria into a plurality of rendering instructions, wherein the plurality of rendering instructions comprise alphanumeric characters;
   processing, in the at least one game server and using the content classification module, the search criteria to determine a plurality of asset signatures, wherein at least some of the asset signatures comprise one or more vectors or matrices comprising data representative of pixel values;
   querying a database comprising a plurality of stored asset signatures, wherein the database is remote from the at least one of the plurality of client devices and wherein the query comprises the plurality of asset signatures; and
   retrieving one or more personal visual symbols based upon a comparison of the plurality of stored asset signatures and the determined plurality of asset signatures.

2. The method of claim 1 wherein the at least one game server is configured to concurrently communicate with at least 20 of the plurality of client devices.

3. The method of claim 1, wherein the retrieved one or more personal visual symbol data comprises at least one of an image file or a plurality of rendering instructions in an alphanumeric format.

4. The method of claim 1, further comprising generating the plurality of stored asset signatures by generating multiple personal visual symbols, in at least one of the plurality of client devices, wherein at least some of the multiple personal visual symbols comprise imagery designed to be not permissible in the multi-player gaming network and at least some of the multiple personal visual symbols comprise imagery designed to be permissible in the multi-player gaming network.

5. The method of claim 4, further comprising receiving, in the at least one game server, the personal visual symbols which comprise imagery designed to not be permissible in the multi-player gaming network and the personal visual symbols which comprise imagery designed to be permissible in the multi-player gaming network and assigning one or more labels to each of the personal visual symbols which comprise imagery designed to not be permissible in the multi-player gaming network and the personal visual symbols which comprise imagery designed to be permissible in the multi-player gaming network, wherein each of the one or more labels comprises a value indicative of whether a personal visual symbol is or is not to be permitted in the multi-player gaming network.

6. The method of claim 5, further comprising submitting each of the labelled personal visual symbols which comprise imagery designed to not be permissible in the multi-player gaming network and the labelled personal visual symbols which comprise imagery designed to be permissible in the multi-player gaming network to at least one machine learning module, wherein the at least one machine learning module is configured to generate a trained classification module.

7. The method of claim 6, wherein the content classification module comprises the trained classification module.

8. The method of claim 6, wherein at least one of the imagery designed to not be permissible in the multi-player gaming network or the imagery designed to be permissible in the multi-player gaming network is submitted to the at least one machine learning module in a form of alphanumeric text without an accompanying graphical image.

9. The method of claim 1, further comprising assessing at least one of the retrieved one or more personal visual symbols or the determined plurality of asset signatures for similar personal visual symbols.

10. A system for indexing digital media and extracting one or more signatures of the digital media to enable a search of personal visual symbols in a multi-player gaming network, wherein the multi-player gaming network comprises at least one game server and a plurality of client devices in data communication and located remote from each other, the system comprising:
one or more processors in a computing device, said one or more processors configured to execute a plurality of executable programmatic instructions to index digital media and extract one or more signatures of the digital media to enable a search of personal visual symbols in the multi-player gaming network;
a content search module, stored locally in at least one of the plurality of client devices, configured to generate a user interface through which a user may input search criteria for one or more digital media;
a content classification module in the at least one game server, configured to receive the search criteria, to augment the search criteria by transforming the search criteria into a plurality of rendering instructions, wherein the plurality of rendering instructions comprise alphanumeric characters, and to process the search criteria to determine a plurality of asset signatures, wherein at least some of the asset signatures comprise one or more vectors or matrices comprising data representative of pixel values; and
a database remote from the at least one of the plurality of client devices and comprising a plurality of stored asset signatures, wherein the database is configured to be queried by a query comprising the plurality of asset signatures and wherein one or more personal visual symbols are retrieved based upon a comparison of the plurality of stored asset signatures and the determined plurality of asset signatures.

11. The system of claim 10 wherein the at least one game server is configured to concurrently communicate with at least 20 of the plurality of client devices.

12. The system of claim 10, wherein the retrieved one or more personal visual symbol data comprises at least one of an image file or a plurality of rendering instructions in an alphanumeric format.

13. The system of claim 10, configure to generate the plurality of stored asset signatures by generating multiple personal visual symbols, in at least one of the plurality of client devices, wherein at least some of the multiple personal visual symbols comprise imagery designed to be not permissible in the multi-player gaming network and at least some of the multiple personal visual symbols comprise imagery designed to be permissible in the multi-player gaming network.

14. The system of claim 13, configured to receive, in the at least one game server, the personal visual symbols which comprise imagery designed to not be permissible in the multi-player gaming network and the personal visual symbols which comprise imagery designed to be permissible in the multi-player gaming network and assigning one or more labels to each of the personal visual symbols which comprise imagery designed to not be permissible in the multi-player gaming network and the personal visual symbols which comprise imagery designed to be permissible in the multi-player gaming network, wherein each of the one or more labels comprises a value indicative of whether a personal visual symbol is or is not to be permitted in the multi-player gaming network.

15. The system of claim 14, configured to submit each of the labelled personal visual symbols which comprise imagery designed to not be permissible in the multi-player gaming network and the labelled personal visual symbols which comprise imagery designed to be permissible in the multi-player gaming network to at least one machine learning module, wherein the at least one machine learning module is configured to generate a trained classification module.

16. The system of claim 15, wherein the content classification module comprises the trained classification module.

17. The system of claim 15, wherein at least one of the imagery designed to not be permissible in the multi-player gaming network or the imagery designed to be permissible in the multi-player gaming network is submitted to the at least one machine learning module in a form of alphanumeric text without an accompanying graphical image.

18. The system of claim 10, configured to assess at least one of the retrieved one or more personal visual symbols or the determined plurality of asset signatures for similar personal visual symbols.

* * * * *